United States Patent
Keshavaraj

(10) Patent No.: US 6,299,206 B1
(45) Date of Patent: Oct. 9, 2001

(54) VEHICLE RESTRAINT SYSTEM COMPRISING AN AIRBAG HAVING AN INTEGRATED MOUTH

(75) Inventor: Ramesh Keshavaraj, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/617,882

(22) Filed: Jul. 17, 2000

Related U.S. Application Data

(63) Continuation of application No. 09/136,081, filed on Aug. 18, 1998.

(51) Int. Cl.[7] ................................................ B60R 21/16
(52) U.S. Cl. .......................................... 280/743.1; 280/729
(58) Field of Search ............................... 280/743.1, 729, 280/732, 728.2, 743.2, 728.1

(56) References Cited

U.S. PATENT DOCUMENTS

| | | | |
|---|---|---|---|
| 4,006,918 | 2/1977 | MacFarland | 280/729 |
| 4,169,613 | 10/1979 | Barnett | 280/732 |
| 5,310,216 | * 5/1994 | Wehner et al. | 280/743.1 |
| 5,316,337 | * 5/1994 | Yamaji et al. | 280/743.1 |
| 5,529,340 | * 6/1996 | Fairbanks | 280/743.1 |
| 5,533,755 | * 7/1996 | Nelsen et al. | 280/743.1 |
| 5,632,506 | 5/1997 | Shellabarger | 280/743.1 |
| 5,664,805 | 9/1997 | Yoshida et al. | 280/743.1 |
| 5,667,243 | 9/1997 | Fisher et al. | 280/730.2 |
| 5,855,393 | * 1/1999 | Keshavaraj | 280/743.1 |
| 5,857,696 | 1/1999 | Inoue et al. | 280/728.2 |
| 5,865,467 | * 2/1999 | Bito et al. | 280/743.1 |
| 6,019,390 | * 2/2000 | Keshavaraj | 280/743.1 |

* cited by examiner

Primary Examiner—Kenneth R. Rice
Assistant Examiner—Lynda Jasmin
(74) Attorney, Agent, or Firm—Terry T. Moyer; William S. Parks

(57) ABSTRACT

The present invention relates to a vehicle restraint system which comprises an airbag into which an inflator can assembly may be placed. The inventive airbag preferably comprises two body panels, attached by one substantially straight seam, and a separator panel which, upon folding and attaching of the two body panel sections of the airbag produces a mouth (looped pocket) for holding of the above-mentioned inflator can assembly. Such an article allows for quick and complete inflation upon release of propellant and facilitates packing in a standard restraint system enclosure. The invention thus encompasses both the restraint system and the airbag itself.

8 Claims, 3 Drawing Sheets

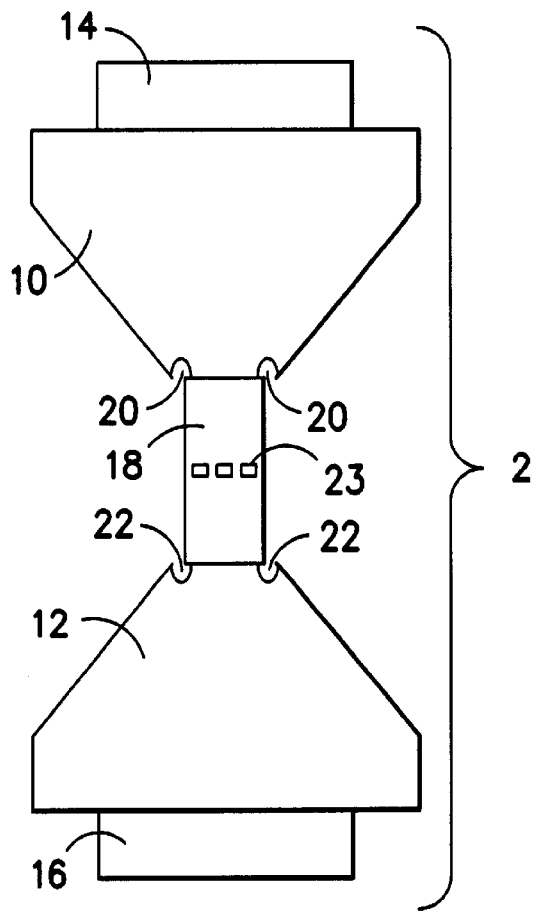
FIG. -1-
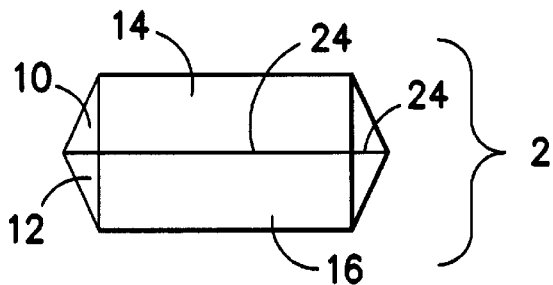
FIG. -2-
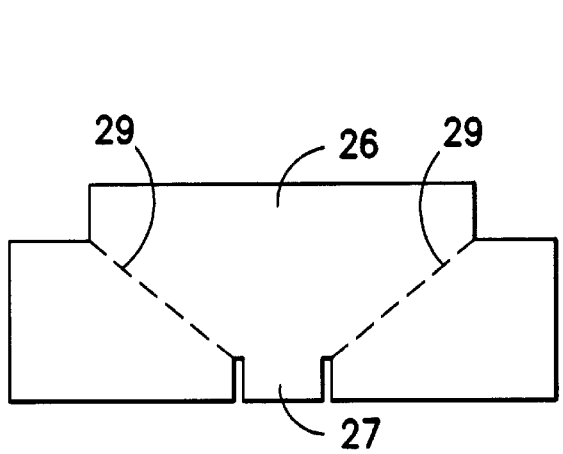
FIG. -3-
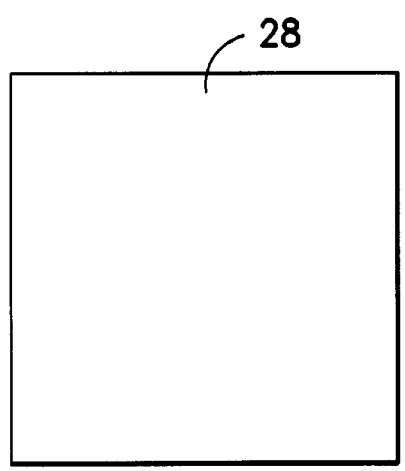
FIG. -4-

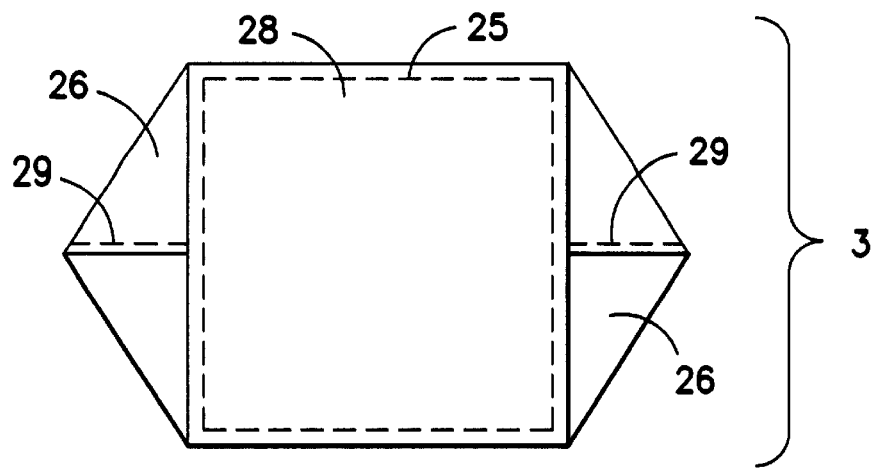
FIG. -5-
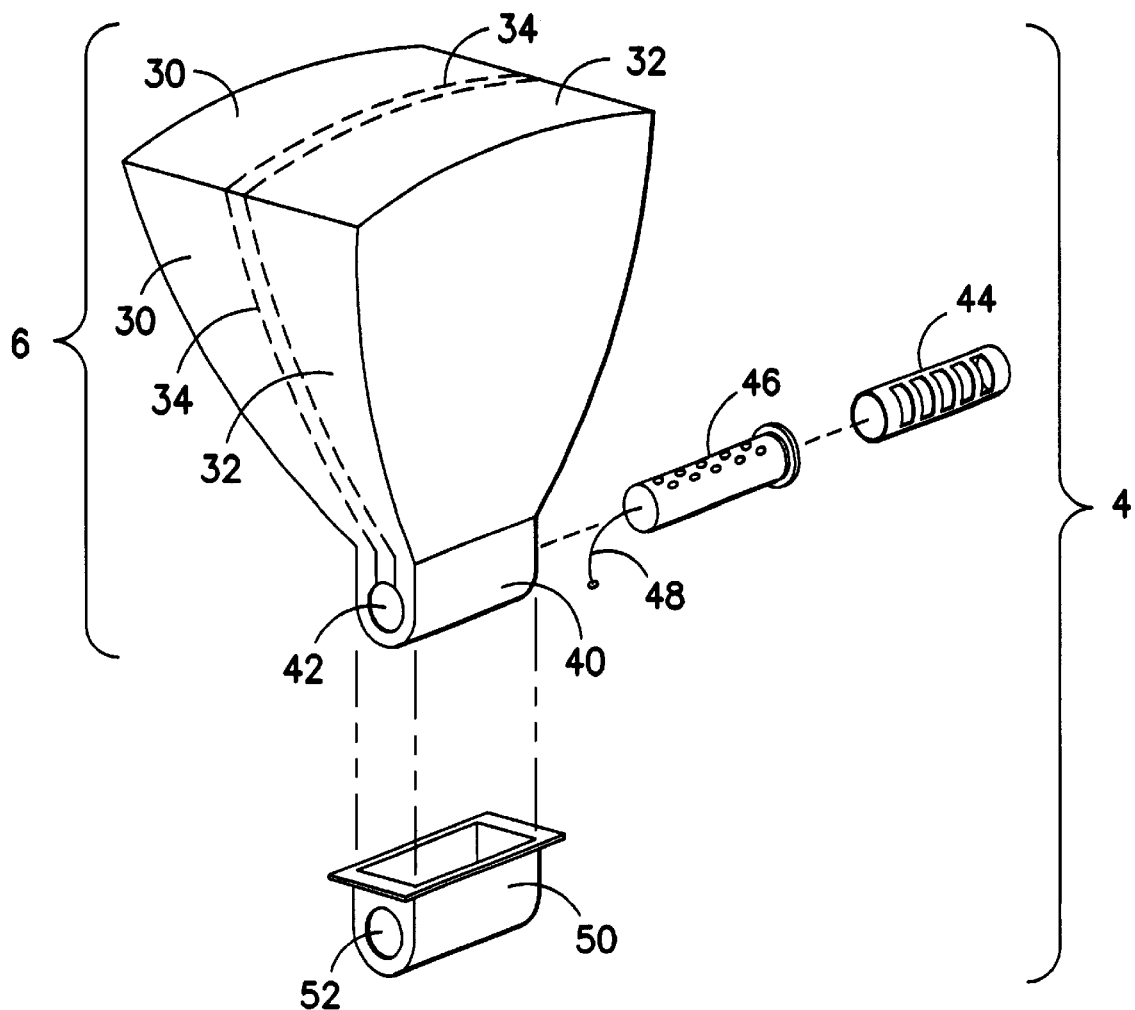
FIG. -6-

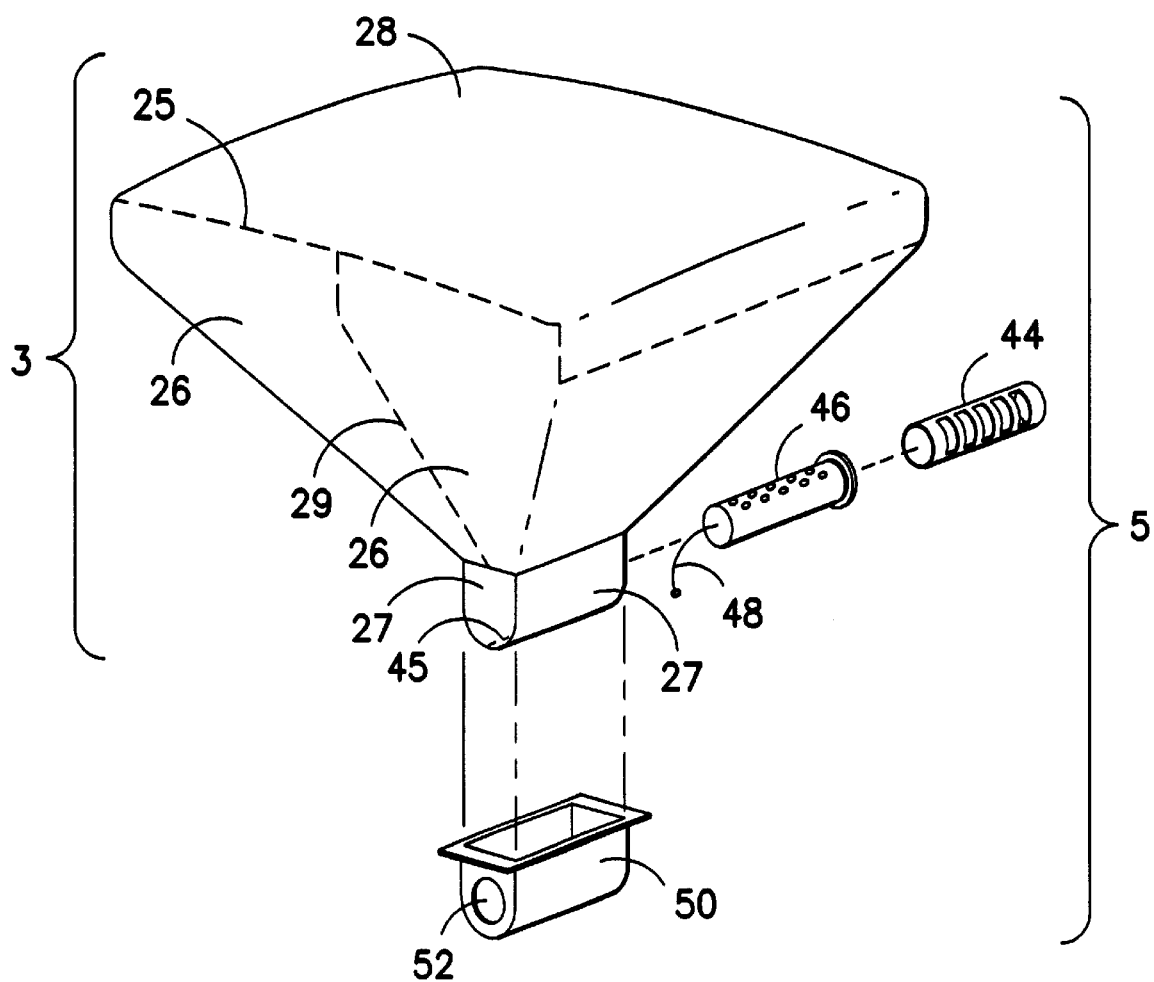
FIG. —7—

VEHICLE RESTRAINT SYSTEM COMPRISING AN AIRBAG HAVING AN INTEGRATED MOUTH

CROSS-REFERENCE TO RELATED APPLICATION

This application is a continuation of co-pending application of U.S. patent application Ser. No. 09/136,081, filed on Aug. 18, 1998, of Ramesh Keshavaraj for Vehicle Restraint System Comprising an Airbag Having an Integrated. This application is incorporated herein by reference.

FIELD OF THE INVENTION

The present invention relates to a vehicle restraint system which comprises an airbag into which an inflator can assembly may be placed. The inventive airbag preferably comprises two body panels, attached by one substantially straight seam, and a separator panel which, upon folding and attaching of the two body panel sections of the airbag produces a mouth (looped pocket) for holding of the above-mentioned inflator can assembly. Such an article allows for quick and complete inflation upon release of propellant and facilitates packing in a standard restraint system enclosure. The invention thus encompasses both the restraint system and the airbag itself.

BACKGROUND OF THE PRIOR ART

Inflatable protective cushions used in passenger vehicles are a component of relatively complex passive restraint systems. The main elements of these systems are: an impact sensing system, an ignition system, a propellant material, an attachment device, a system enclosure, and an inflatable protective cushion. Upon sensing an impact, the propellant is ignited causing an explosive release of gases filing the cushion to a deployed state which can absorb the impact of the forward movement of a body and dissipate its energy by means of rapid venting of the gas. The entire sequence of events occurs within about 30 milliseconds. In the undeployed state, the cushion is stored in or near the steering column, the dashboard, in a door, or in the back of a front seat placing the cushion in close proximity to the person or object it is to protect.

Inflatable cushion systems commonly referred to as air bag systems have been used in the past to protect both the operator of the vehicle and passengers. Systems for the protection of the vehicle operator have typically been mounted in the steering column of the vehicle and have utilized cushion constructions directly deployable towards the driver. These driver-side cushions are typically of a relatively simple configuration in that they function over a fairly small well-defined area between the driver and the steering column. One such configuration is disclosed in U.S. Pat. No. 5,533,755 to Nelsen et al., issued Jul. 9, 1996, the teachings of which are incorporated herein by reference.

Inflatable cushions for use in the protection of passengers against frontal or side impacts must generally have a more complex configuration since the position of a vehicle passenger may not be well defined and greater distance may exist between the passenger and the surface of the vehicle against which that passenger might be thrown in the event of a collision. Prior cushions for use in such environments are disclosed in U.S. Pat. No. 5,520,416 to Bishop, issued May 28, 1996; U.S. Pat. No. 5,454,594 to Krickl issued Oct. 3, 1995; U.S. Pat. No. 5,423,273 to Hawthorn et al. issued Jun. 13, 1995; U.S. Pat. No. 5,316,337 to Yamaji et al. issued May 31, 1994; U.S. Pat. No. 5,310,216 to Wehner et al. issued May 10, 1994; U.S. Pat. No. 5,090,729 to Watanabe issued Feb. 25, 1992; U.S. Pat. No. 5,087,071 to Wallner et al. issued Feb. 11, 1992; U.S. Pat. No. 4,944,529 to Backhaus issued Jul. 31, 1990; and U.S. Pat. No. 3,792,873 to Buchner et al. issued Feb. 19, 1974, all of which are incorporated herein by reference.

The majority of commercially used restraint cushions are formed of woven fabric materials utilizing multifilament synthetic yarns of materials such as polyester, nylon 6 or nylon 6,6 polymers. Representative fabrics for such use are disclosed in U.S. Pat. No. 4,921,735 to Bloch issued May 1, 1990; U.S. Pat. No. 5,093,163 to Krummheuer et al. issued Mar. 3, 1992; U.S. Pat. No. 5,110,666 to Menzel et al. issued May 5, 1992; U.S. Pat. No. 5,236,775 to Swoboda et al. Aug. 17, 1993; U.S. Pat. No. 5,277,230 to Sollars, Jr. issued Jan. 11, 1994; U.S. Pat. No. 5,356,680 to Krummheuer et al. Oct. 18, 1994; U.S. Pat. No. 5,477,890 to Krummheuer et al. issued Dec. 26, 1995; U.S. Pat. No. 5,508,073 to Krummheuer et al., issued Apr. 16, 1996; U.S. Pat. No. 5,503,197 to Bower et al. issued Apr. 2, 1996 and U.S. Pat. No. 5,704,402 to Bowen et al. issued Jan. 6, 1998, all of which are incorporated herein by reference.

As will be appreciated, the permeability of the cushion structure is an important factor in determining the rate of inflation and subsequent rapid deflation following the impact event. In order to control the overall permeability of the cushion, it may be desirable to use differing materials in different regions of the cushion. Thus, the use of several fabric panels in construction of the cushion may prove to be a useful design feature. The use of multiple fabric panels in the cushion structure also permits the development of relatively complex three dimensional geometries which may be of benefit in the formation of cushions for passenger side applications wherein a full bodied cushion is desired. While the use of multiple fabric panels provides several advantages in terms of permeability manipulation and geometric design, the use of multiple fabric panels for use in passenger side restraint cushions has historically required the assembly of panels having multiple different geometries involving multiple curved seams.

As will be appreciated, an important consideration in cutting panel structures from a base material is the ability to maximize the number of panels which can be cut from a fixed area through close-packed nesting of the panels. It has been found that minimizing the number of different geometries making up panels in the cushion and using geometries with substantially straight line perimeter configurations generally permits an enhanced number of panels to be cut from the base material. The use of panels having generally straight line profiles has the added benefit of permitting the panels to be attached to one another using substantially straight seams or be substantially formed during the weaving process using a jacquard or dobby loom. Such a straight seam configuration provides a more cost-effective method of producing such airbags.

Furthermore, current vehicle restraint systems comprise an airbag which is attached, through a fastening or adhesive means, to an inflator can. In fact, the standard vehicle restraint system itself generally comprises an inflator can retainer, an inflator can, a housing (in the inflator can is disposed), a folded airbag attached, as noted above, to the housing, an airbag retainer to prevent release of the airbag, and an airbag door. The components parts, the manpower needed to assemble the system, and the extra parts required to properly store the airbag all add up to substantial cost for the consumer. Additionally, since airbags must be three dimensional in shape in order to accord proper cushioning within such a restraint system, the manufacture and, most importantly, folding of such airbags for introduction into and storage within such a system is both cumbersome and costly as well. Without any prior art improvements which adequately address these problems, there is a clear need for producing a cost-effective and manufacturer-friendly vehicle restraint system.

The present invention provides a vehicle restraint system which comprises an airbag and an inflator can assembly, whereby the inflator can of such an assembly is disposed within the airbag itself, rather than attached by adhesives, staples, and the like. The particularly preferred airbag configuration may be constructed from two mirror-image body panel sections and one rectilinear center panel section. Upon folding and contacting of the corresponding areas of each of the body panel sections, the sections are connected to one another and to the center panel section by a series of flat, straight seams. Thus, the airbag configuration formed according to the present invention results in highly efficient utilization of materials and may be constructed substantially without the need for complex curved seaming operations. As such, the present invention constitutes a useful advancement over the present art. Furthermore, the rectilinear panel thus forms a looped pocket into which the inflator can, comprising the inflator itself, is disposed. In a particularly preferred embodiment, the housing of the system surround the looped pocket of the airbag while the inflator can and inflator fit inside both the airbag and the housing simultaneously. Additionally, the utilization of tie-rods within the design of the inventive airbag provides a cost-effective alternative to the standard and currently used three dimensional configurations.

SUMMARY OF THE INVENTION

In view of the foregoing, it is a general object of the present invention to provide a cost-effective, easy to manufacture vehicle restraint system. The term vehicle restraint system is intended to mean both inflatable occupant restraining cushion and the mechanical and chemical components (such as the inflation means, ignition means, propellant, and the like). It is a more particular object of the present invention to provide a vehicle restraint system wherein the inflator can is disposed within the airbag. It is a further object of the present invention to provide an airbag manufactured from mirror-image panel sections separated by a rectilinear section which, upon folding and contacting of the corresponding mirror-image areas of the two sections, the sections are connected to one another by a series of substantially straight, flat seams. It is another object of the present invention to provide an airbag comprising a rectilinear separating section which, upon folding, forms a looped pocket in which the inflator can is disposed. It is yet an additional object of the present invention to provide a vehicle restraint system wherein the airbag remains in proper inflation position through the utilization of the looped pocket in which the inflator can is disposed and not through the necessary utilization of tie-rods or adhesives. Another object of the invention is to provide a method of making a low cost vehicle restraint system of simple and structurally efficient design.

To achieve these and other objects and in accordance with the purpose of the invention, as embodied and broadly described herein, the present invention provides an airbag cushion for use in a vehicle restraint system, which comprises a looped pocket for introduction of the inflator can of an inflator assembly. In the most preferred embodiment includes two mirror-image body panel sections two substantially straight seams along corresponding lateral boundary edges. The boundary segments of the body panels which are not joined to one another are joined around the perimeter of a rectilinear center panel by a series of substantially straight seams thereby forming a looped pocket in the airbag as well as an overall inflatable cushion structure. The airbag itself need not be created from two mirror-image body panel sections as any configuration of fabric panels will function properly in this invention as long as a three-dimensional inflatable cushion is formed and a looped pocket is created in the airbag in which the at least the inflator can of an inflator assembly is disposed.

Additional objects and advantages of the invention will be set forth in part in the description which follows, and in part will be obvious from the description, or may be learned by practice for the invention. It is to be understood that both the foregoing general description and the following detailed description of preferred embodiments are exemplary and explanatory only, and are not to be viewed as in any way restricting the scope of the invention as set forth in the claims.

BRIEF DESCRIPTION OF THE DRAWINGS

The accompanying drawings, which are incorporated in and constitute a part of this specification, illustrate several potentially preferred embodiments of the invention and together with the description serve to explain the principles of the invention wherein:

FIG. 1 illustrates an aerial perspective view of the airbag of the present invention prior to folding and seaming;

FIG. 2 is a front perspective view of the folded and seamed inventive airbag after inflation; the term "front' is intended to mean that portion of the airbag which is intended to be impacted by a person or object to be protected;

FIG. 3 illustrates an aerial perspective of one body panel section of a multi-piece airbag of the present invention prior to folding and seaming;

FIG. 4 illustrates an aerial perspective of a center panel section of a multi-piece airbag of the present invention prior to seaming;

FIG. 5 illustrates a front perspective view of the folded and seamed inventive airbag comprising the sections of FIGS. 3 and 4 after inflation;

FIG. 6 illustrates one embodiment of the inventive vehicle restraint system including the disposition of the inflator assembly within the inflated airbag.

FIG. 7 illustrates an alternative embodiment of the inventive vehicle restraint system including the specific fabric components depicted in FIGS. 3 and 4.

DESCRIPTION OF THE PREFERRED EMBODIMENTS

Reference will now be made in detail to potentially preferred embodiments of the invention, examples of which have been illustrated in the accompanying drawings. It is to be understood that it is in no way intended to limit the invention to such illustrated and described embodiments. On the contrary, it is intended to cover all alternatives, modifications and equivalents as may be included within the true spirit and scope of the invention as defined by the appended claims and equivalents thereto.

Turning now to the drawings, wherein like elements are denoted by like reference numerals throughout the various views, in FIG. 1 there is shown an unfolded and unseamed inflatable restraint cushion (airbag) 2. As will be noted, this unfolded and unseamed inflatable restraint cushion 2 includes a first body panel section 10 and a second body panel section 12 which are mirror images of each other. In alternative embodiments, these body panel sections 10, 12 are not required to be of the same shape and configuration. However, it has proven more cost effective to cut the body panel sections 10, 12 as two separate pieces and attaching them to each other through the use of a substantially straight seam. Additionally, it has proven to be more cost effective if the body panel sections 10, 12 (or the larger panel section in the alternative embodiments) are altered to fit the entire width of the fabric in order to provide the most efficient use of the fabric itself. Attached to the end of these body panel sections 10, 12 are two end panels 14, 16, which are also mirror images of each other. As with the body panel sections 10, 12, these end panels 14, 16 may be of any configuration or shape in alternative embodiments. Furthermore, the end panels 14, 16 may also be omitted in order for a one-piece airbag (such as in FIG. 6) to be utilized. Separating the two body panel sections 10, 12 is a rectilinear separator panel section 18. In combination with curved indentations 20, 22 within the two body panel sections 10, 12, this rectilinear panel 18 will form a looped pocket 42 of FIG. 3 to permit disposition of the inflator can assembly 44, 46, 48 of FIG. 3. This separator panel 18 may be of any shape which ultimately provides a looped pocket configuration in the airbag 2 upon folding and seaming of at least the two body panel sections 10, 12. Furthermore, this separator panel 18 preferably, though not necessarily, comprises a means for permitting inflator can of differing sizes to be placed therein. In this illustration, rectilinear slits 23 are cut into the separator panel at a position equidistant from the body panel sections 10, 12 which run parallel to the short sides of the separator panel 18.

In FIG. 2, there is illustrated a potentially preferred singular seaming arrangement for use in establishing the connective relationship between the body panel section 10 and the other 12 as well as the end panel 14 to the other 16. As illustrated, the body panel sections 10, 12 as well as the end panels 14, 16 are connected to one another by means of a substantially straight body seam 24. Such a single seam 24 provides a simplified manner of producing such airbags, particularly in large-scale sewing operations. While only one such body seam 26 is illustrated in FIG. 2 it is to be understood that in the preferred embodiment an identical seam is likewise disposed along the length of the body panel sections 10, 12 on the opposite side of the airbag 2. Alternative embodiments include those which utilize any number of seams to connect the panel sections 10, 12 to one another. Once the seaming operations are completed, the airbag 2 is preferably turned inside out so as to place the seams on the interior thereof during an inflation.

It will be understood that reference herein to seams or seaming operations include not only traditional sewn seams but also by way of example only and not limitation, interwoven seams, adhesive seams, melt bonded seams, ultrasonic seams, and other suitable attachment methods as may be known to those of skill in the art. Thus, while traditional sewn seams may be preferred, the invention is in no way limited thereto.

FIGS. 3 and 4 illustrate a preferred multi-piece airbag configuration for the inventive restraint system. FIG. 3 is a depiction of one body panel section 26 (at least two of such panel sections are needed to form an airbag) which includes a centrally disposed section 27 which, upon attachment to its corresponding section on a second body panel section forms a looped pocket for introduction and storage of an inflator can assembly (not illustrated). Lines 29 show the folding and seaming points for this first body panel section 26 to a second mirror-image body panel section (not illustrated). A center panel section 28 (FIG. 4) is utilized in combination with the two body panel sections 26 to form the airbag 3 (FIG. 5). FIG. 5 depicts the airbag 3 after seaming and inflation. The center panel 28 is attached by substantially straight seams 25 to the two body panel sections 26. The two body panel sections are also attached to each other by substantially straight seams 29.

In FIG. 6 there is illustrated a preferred configuration for the inventive vehicle restraint system 4. The system 4 comprises an airbag 6 having a looped pocket 42, an inflator can 44, a diffuser 46, including an ignition wire 48, and a housing 50. The inflator can 44 and diffuser 46 are disposed within both the airbag 6, particularly within the looped pocket 42, and within the housing 50. As this view is of the airbag 6 in its inflated state, it will be appreciated that the airbag 6 also fits within the housing 50 when it is folded and undeployed. A restraint cover and/or door (neither illustrated) is generally placed over the undeployed airbag 6 when it is within the inflation module and stored either within the steering column or the dashboard of a vehicle. This configuration also illustrates another possible and preferred design for the inventive airbag 6. The airbag 6 comprises two body panel sections 30, 32 which are connected by a single substantially straight seam 34. Again, however, a single seam and single piece airbag is merely a preferred embodiment of the inventive system and airbag. The most important component of the invention is the pocket into which the inflator can assembly is disposed within both the folded and inflated airbag.

In FIG. 7 there is illustrated another potentially preferred configuration for the inventive vehicle restraint system 5. The system 5 comprises an airbag 3 having a looped pocket 43, which is the result of attaching two centrally disposed sections 27 together by a straight seam 45. The system 5 also comprises an inflator can 44, a diffuser 46, including an ignition wire 48, and a housing 50. The inflator can 44 and diffuser 46 are disposed within both the airbag 3, particularly within the looped pocket 42, and within the housing 50. As this view is of the airbag 3 in its inflated state, it will be appreciated that the airbag 3 also fits within the housing 50 when it is folded and undeployed. A restraint cover and/or door (neither illustrated) is generally placed over the undeployed airbag 3 when it is within the inflation module and stored either within the steering column or the dashboard of a vehicle. The airbag 3 comprises two separate body panel sections 26, connected together by a straight seam on both sides 29 (the other not illustrated) and a center panel section 28 which is connected to the body panel sections 26 by a straight seam 25.

The materials of construction from which the individual body panel sections 10, 12, end panels 14, 16, and rectilinear separator panel 18 (of FIG. 1), as well as body panel sections 26, centrally disposed sections 27, and central panel section 28 (of FIG. 7) are formed, may be either similar or dissimilar from one another. Each of these panels may be formed from a number of materials including by way of example only and not limitation woven fabrics, knitted fabrics, non-woven fabrics, films and combinations thereof. Woven fabrics may be preferred with woven fabrics formed of tightly woven construction such as plain or panama weave constructions being particularly preferred. Such woven fabrics may be formed from yarns of polyester, polyamides such as nylon 6 and nylon-6,6 or other suitable material as may be known to those in the skill in the art. Multifilament yarns having a relatively low denier per filament rating of not greater than about 1–4 denier per filament may be desirable for bags requiring particular good foldability.

In application, woven fabrics formed from synthetic yarns having linear densities of about 40 denier to about 1200 denier are believed to be useful in the formation of the airbag 2 (of FIG. 1) and/or 3 (of FIG. 7) according to the present invention. Fabrics formed from yarns having linear densities of about 315 to about 840 are believed to be particularly useful, and fabrics formed from yarns having linear densities in the range of about 400 to about 650 are believed to be most useful.

While each of the panels 10, 12, 14, 16, 18 (of FIG. 1) or 26, 27, and 28 (of FIG. 7) may be formed of the same material, the panels may also be formed from differing materials and or constructions. By way of example only and not limitation, one or both of the body panel sections 10, 12 and the end panels 14, 16 may be formed from an uncoated relatively high permeability fabric having an air permeability of about 5 CFM per square foot or higher while the separator panel 18 is formed from a coated or uncoated fabric having an air permeability of about 3 CFM per square foot or less when measured at a differential pressure of 0.5 inches of water across the fabric. Fabrics having permeabilities of about 1–3 CFM per square foot may be desirable in either the body panels or center panel section. Fabrics having permeabilities below 2 CFM and preferably below 1 CFM in the uncoated state may be preferred. Such fabrics which have permeabilities below 2 CFM which permeability does not substantially increase by more than a factor of about 2 when the fabric is subjected to biaxial stresses in the range of up to about 100 pounds force may be particularly preferred. Fabrics which exhibit such characteristics which are formed by means of fluid jet weaving may be most preferred.

In the event that a coating is utilized on one or more material panels, neoprene, silicone urethanes or disperse polyamides may be preferred. Coatings such as dispersed polyamides having dry add on weights of about 0.6 ounces per square yard or less and more preferably about 0.4 ounces per square yard or less and most preferably about 0.3 per square yard or less may be particularly preferred so as to minimize fabric weight and enhance foldability. It is, of course, to be understood that aside from the use of coatings, different characteristics in various panels may also be achieved through the use of fabrics incorporating differing weave densities and/or finishing treatments such as calendaring as may be known to those in the skill of the art.

While the airbag 2 according to the present invention has been illustrated and is described herein in terms of the principal panel sections 10, 12, 18, it is to be understood that such airbag 2 may also include additional components such as shape defining tethers, gas vents, and the like as may be known to those in the skill of the art. The same is true for the principal panel sections of FIG. 7.

While specific embodiments of the invention have been illustrated and described, it is to be understood that the invention is not limited thereto, since modifications may certainly be made and other embodiments of the principals of this invention will no doubt occur to those skilled in the art. Therefore, it is contemplated by the appended claims to cover any such modifications and other embodiments as incorporate the features of this invention which in the true spirit and scope of the claims hereto.

What I claim is:

1. A vehicle restraint system comprising
   an airbag inflator can; and
   a single chambered airbag comprising multiple fabric panels and including a pocket; wherein
   said airbag inflator can is disposed within said pocket of said airbag;
   wherein all attachments utilized to attach said multiple fabric panels together to form said airbag are substantially straight seams; and
   wherein said airbag forms a non-flat structure in its uninflated state.

2. The vehicle restraint system of claim 1 wherein
   said airbag comprises first and second body panel sections which are the mirror image each other and at least a third body panel section for attachment to both of said first and second body panel sections;
   wherein first body panel section comprises a first end and a second end and said second body panel section comprises a first end and a second end, wherein said first body panel section further comprises a centrally disposed fabric section on either of said first or second end, wherein said second body panel section further comprises a centrally disposed fabric section on either of said first or second end, and wherein said centrally disposed fabric sections on said first and second body panel sections are present on the corresponding ends of said body panel sections;
   wherein upon attachment of said first and second body panel sections together and to said at least third body panel section, and upon attachment together of said centrally disposed fabric sections of said first and second body panel sections, said airbag is formed; and
   wherein said pocket is formed by the attachment of said centrally disposed fabric sections panels of said first and second body panel sections.

3. The vehicle restraint system of claim 2 wherein said airbag forms a pyramidal structure in its uninflated state.

4. The vehicle restraint system of claim 1 wherein said airbag forms a pyramidal structure in its uninflated state.

5. A single chambered airbag comprising multiple fabric panels and including a
   pocket;
   wherein all attachments utilized to attach said multiple fabric panels together to form said airbag are substantially straight seams; and
   wherein said airbag forms a non-flat structure in its uninflated state.

6. The airbag of claim 5 wherein
   said airbag comprises first and second body panel sections which are the mirror image each other and at least a third body panel section for attachment to both of said first and second
   wherein first body panel section comprises a first end and a second end and said second body panel section comprises a first end and a second end, wherein said first body panel section further comprises a centrally disposed fabric section on either of said first or second end, wherein said second body panel section further comprises a centrally disposed fabric section on either of said first or second end, and wherein said centrally disposed fabric sections on said first and second body panel sections are present on the corresponding ends of said body panel sections;
   wherein upon attachment of said first and second body panel sections together and to said at least third body panel section, and upon attachment together of said centrally disposed fabric sections of said first and second body panel sections, said airbag is formed; and wherein said pocket is formed by the attachment of said centrally disposed fabric sections panels of said first and second body panel sections.

7. The vehicle restraint system of claim 6 wherein said airbag forms a pyramidal structure in its uninflated state.

8. The vehicle restraint system of claim 5 wherein said airbag forms a pyramidal structure in its uninflated state.

* * * * *